July 16, 1946.　　　F. H. McCORMICK　　　2,404,139
DOMESTIC APPLIANCE
Filed Sept. 30, 1938　　　3 Sheets-Sheet 3

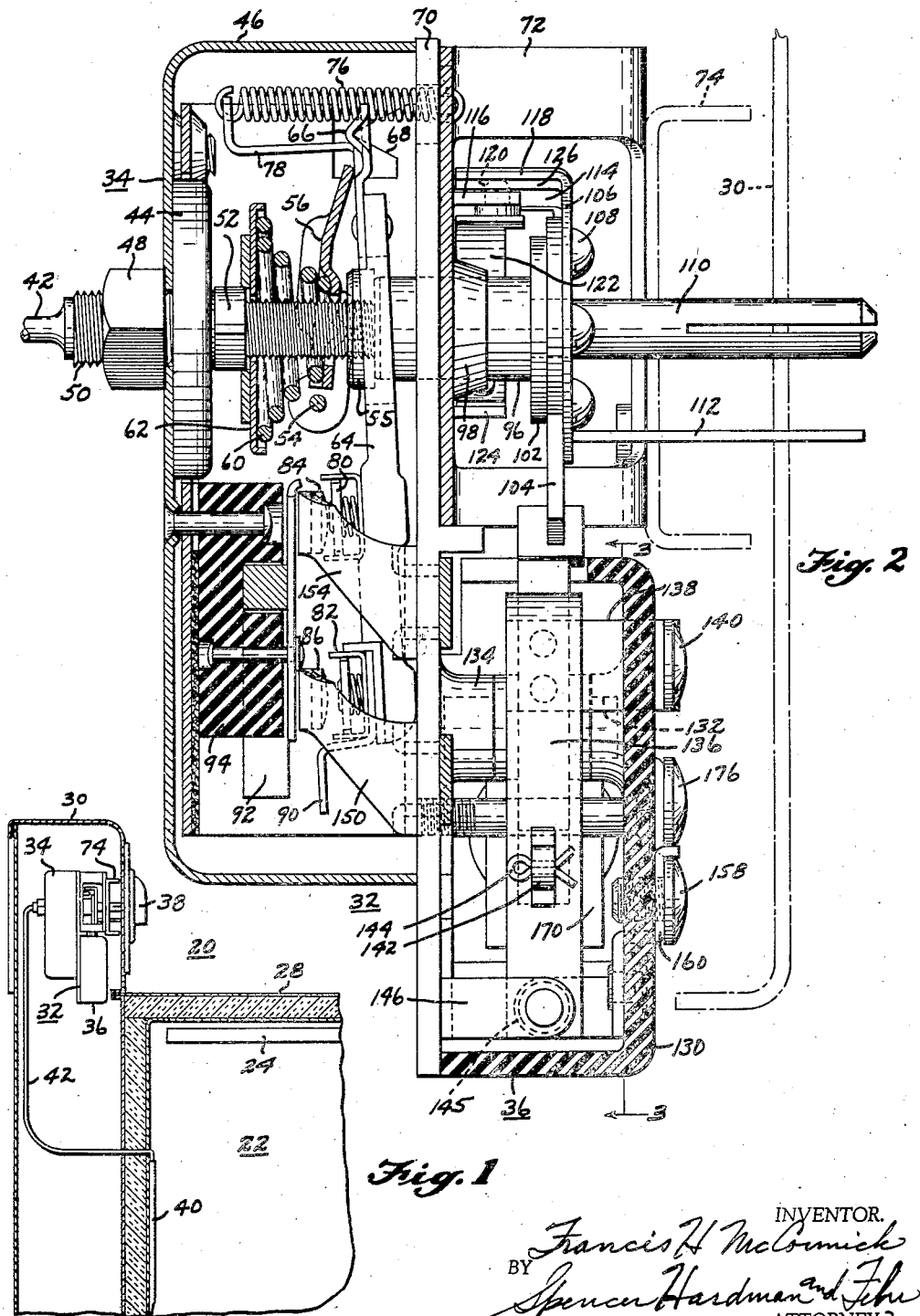

OFF

PREHEAT

BAKE

BROIL

INVENTOR.
Francis H. McCormick
BY Spencer Hardman and Fehr
ATTORNEYS

Patented July 16, 1946

2,404,139

UNITED STATES PATENT OFFICE 2,404,139

DOMESTIC APPLIANCE

Francis H. McCormick, Dayton, Ohio, assignor to General Motors Corporation, Dayton, Ohio, a corporation of Delaware Application September 30, 1938, Serial No. 232,592

13 Claims. (Cl. 219—20)

This invention relates to a domestic appliance and more particularly to heating arrangements in two-unit electric ovens and controls therefor.

It has been found that the most desirable arrangement for an electric oven is the so-called two-unit oven in which an upper heating unit is provided primarily for broiling and a lower heating unit is provided primarily for baking. However, in order to provide better heating arrangements these two heating units are controlled so as to provide a preheat arrangement in which both upper and lower heating units are so connected to the source of power as to provide their combined full heating capacity for preheating purposes. Also for baking it has been found desirable in order to obtain the best baking conditions to provide an arrangement in which the full heating output of the lower heating unit is used in combination with one-fourth or less than one-fourth the heat output of the upper heating unit.

With the above arrangement, when it is desired to use the oven for baking, it is the usual practice to set the control switch to the preheat position and set the thermostat for the desired temperature. Then when the thermostat indicates that the desired oven temperature has been reached it is necessary to manually change the control switch to the baking position. The objectionable feature of such a system is that it requires close attention to change the control switch from preheat to bake at the proper time. The failure to change the control from the preheat position to the baking position at the proper time results in burned food due to excessive top heat.

It is an object of my invention to eliminate the necessity for the manual change from the preheat to the bake position.

It is a further object of my invention to change the heating arrangement from preheat to bake automatically and to maintain the heating arrangement for preheating and baking the same as before.

It is not sufficient, however, merely to provide a control in which the baking is always begun by preheating. It is also desirable to provide a means whereby the control may start heating the oven directly with the bake arrangement without preceding the baking arrangement with the preheating arrangement. It is desirable to start the oven directly with the baking arrangement when a separate time actuated switch is used to start the heating when food to be baked in the oven is placed in the oven sometime before it is desired that the baking commence. It is therefore an object of my invention to provide a control for a two-unit electric oven which will begin heating with either the preheating or the baking arrangement and will provide an automatic change from the preheating arrangement to the baking arrangement after the preheating is accomplished.

It is another object of my invention to provide a control for an electric range in which the thermostat as well as the switch means for governing the various heating arrangements to provide preheating, baking, broiling and a positive "off" position are all controlled by the same manual operating device.

It is still another object of my invention to provide such a single knob control in which the switch means is capable of making the change from the preheat arrangement to the baking arrangement automatically when preheating is accomplished.

It is still another object of my invention to provide in such a control optional means of starting heating with either the preheating or baking arrangement.

Further objects and advantages of the present invention will be apparent from the following description, reference being had to the accompanying drawings, wherein a preferred form of the present invention is clearly shown.

In the drawings:

Fig. 1 is a fragmentary sectional view of an electric range showing the application of my improved control thereto;

Fig. 2 is a sectional view of the control device shown in Fig. 1;

Figure 3:
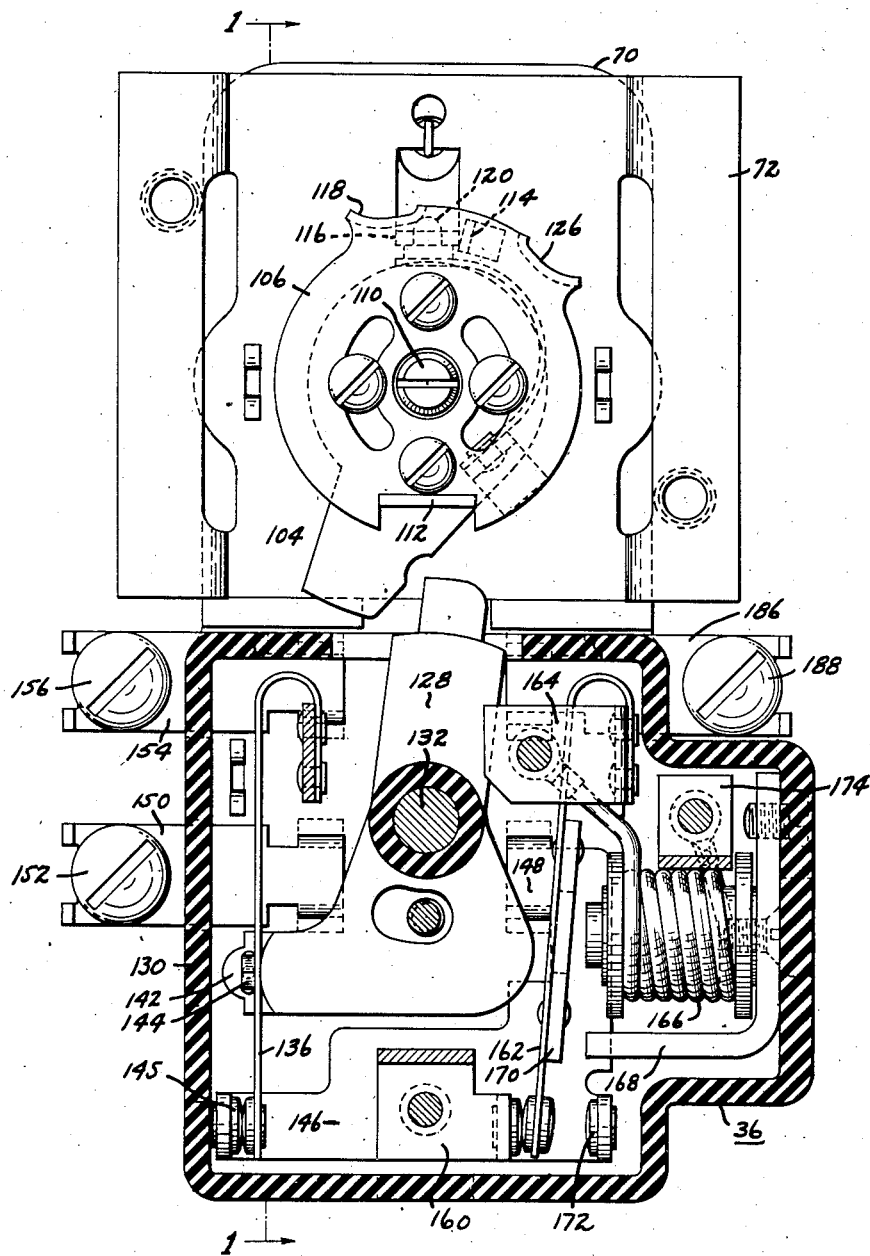
Fig. 3 is a front view of the control device with a portion of the insulating cover removed.
Figure 4:
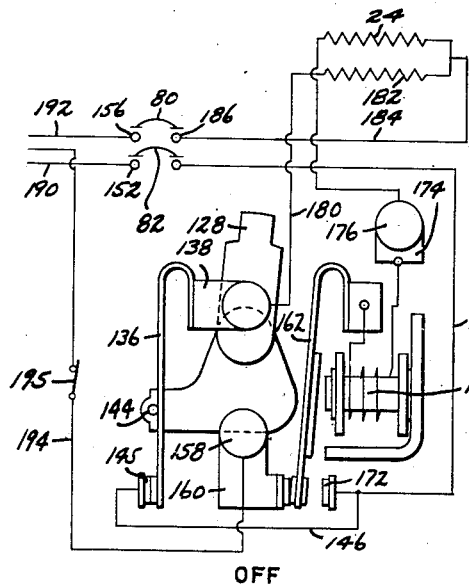
Fig. 4 is a diagrammatic illustration of the switch portion of the control connected to the heating circuits, the switch being shown in the "off" position.

Briefly, I have shown a single knob control for a two-unit electric range in which the single knob operates the thermostat adjustment to obtain different automatically controlled oven temperatures and also provides a preheat position, a broiling position and baking position for various temperatures as well as an "off" position which disconnects two wires of the three-wire power source. The turning of the knob away from the "off" position releases the thermostat and allows it to close. If the knob is turned directly from the "off" position to any one of the indicated temperatures, the thermostat will cause the oven to be heated with the circuits in the baking arrangement. The heating units will be energized as long as and whenever the temperature of the oven is below the desired temperature. In any one of these baking positions of the various temperatures from 150° to 500° F. the lower oven heating unit is connected so as to provide its full output while the output of the upper heating unit is reduced to at least one-fourth of its maximum output.

In order to obtain the broiling arrangement the knob is turned from the "off" position through all the baking positions to the broiling position where it is latched in position so that the full heat output of the upper heating unit is made available and the lower heating unit is disconnected.

The control is provided with a preheat position which is obtained by first turning the knob to the position indicated by preheat or broil and thence returning the knob to the particular temperature setting desired. When this is done both the upper and lower heating units will be energized to provide their full heat output until the preheating of the oven has been completed, and, in particular, has reached the temperature for which the knob has been set. The thermostat will then open and deenergize an electromagnet which is used for holding the upper heating unit fully energized. The deenergization of this electromagnet permits a switch to change the energization of the upper heating unit from full voltage to about one-half full voltage or less, in order to provide the balanced oven heating arrangement used for baking purposes when the thermostat again closes.

Referring now to the drawings and more particularly to Fig. 1 there is shown a fragmentary view of an electric range 20 provided with an insulated oven compartment 22 which has an upper electrical heating unit 24 and a lower electric heating unit, not shown in this figure. The range is provided with a cooking top 28 extending entirely across the top of the oven compartment 22, and at the rear of the cooking top 28 there is provided a back panel 30 upon the back of which is mounted my improved control generally designated by the reference character 32. This control includes a thermostat portion 34 and a circuit control switching portion 36 all of which are located behind the back panel 30 while the knob 38 which constitutes the sole operating device for both the thermostat portion and the switch portion for controlling the heating arrangements is located upon the front of the back panel 30.

The thermostat 34 is operated by a liquid which is contained in a thermostat bulb 40 shown in the oven compartment 22 and connected to the thermostat by capillary tubing 42. This small bore tubing 42 connects to a diaphragm element 44 provided upon the inner face of the thermostat cover 46. This diaphragm element 44 is held in place by a nut 48 which is threaded onto a threaded connecting portion 50 which connects the end of the small bore tubing 42 with the diaphragm element 44.

The movable face of the diaphragm element 44 operates against a stud 52 having an adjusting element 54 threaded thereon which contacts a primary lever 56 pivoted on the pivot pin 58. A conical coil spring 60 extends between a bellows follower 62, provided on the stud 52, and the primary lever 56 for holding the primary lever in contact with the adjusting collar 54. The primary lever 56 is used as a multiplying lever and has its upper end resting against the contact lever 64, provided with a hump 66 which rocks upon the knife edges 68 projecting from the base 70 of the thermostat which is of electrical insulating material. On the other side of the base 70 is a mounting bracket 72 which is used for mounting the control 32 onto the back panel 30 of the range. The range is provided with a channel member 74 to which the mounting bracket 72 is directly connected.

The mounting bracket 72 is also used for anchoring one end of a tension type coil spring 76 which has its other end connected to a projecting portion 78 of the contact lever 64 for holding the hump 66 upon the knife edges 68 and for holding the contact lever 64 in contact with the upper end of the primary multiplying lever 56. The other end of the contact lever 64 is provided with two sets of bridging contacts, the one set being designated by the reference character 80 and the other set being designated by the reference character 82. All of these contacts are spring mounted and are adapted to make contact with the stationary contacts 84 and 86 as well as two other contacts which are located directly behind the contacts 84 and 86 in Fig. 2. Thus the bridging contact 80 bridges the contact 84 and the contact directly behind the contact 84, while the bridging contacts 82 bridge the contact 86 and the contact directly behind the contact 86. The contact lever 64 is provided with an armature 90 which is adapted to be attracted by a U-shaped permanent magnet 92 in order to provide snap action for the contact lever 64. This permanent magnet is supported upon a block 94 of insulating material to which it is riveted and which in turn is held in place by rivets connecting it with the thermostat case 46.

The thermostat 34 is adjusted by turning the threaded collar 54 upon the stud 52 so as to bring it closer or further away from the diaphragm element 44, so as to change the relation between the diaphragm element 44 and the contact lever 64. This threaded collar 54 is directly connected to a shaft 96 which is rotatably mounted in a bearing 98 provided with a flanged end portion 102 which is used to fasten an arm onto its face and over this arm an operating plate 106. The arm 104 and the operating plate 106 are provided with arcuate slots which receive the fastening screws 108 for providing an adjustable connection between the flange 102 and the operating arm 104, as well as the operating plate 106. Extending from the shaft 96 is a slotted knob shaft 110 which extends through an aperture in the back panel 30. The operating plate 106 also has a projection 112 extending parallel to the knob shaft through the back panel 30. This projection 112 as well as the knob shaft 110 are used to support the operating knob 38 and for connecting the operating knob to the operating plate 106, to operate arm 104 of the adjusting collar 54.

The operating plate 106 is also provided with a projection 114 which is used as a stop and contacts a guide ear 116 which is struck out from the mounting bracket 72. The operating plate is also provided with two latch projections, the first projection 118 being used to latch the switch in the "off" position and cooperates with a latch pin 120 which is guided by the guide ear 116, and which is urged into engagement with the projection 118 by a curled leaf spring 122 which extends around the shaft 96 and is anchored to a lip 124 which is struck out from the base portion of the mounting bracket 72. The operating plate 106 is also provided with a second projection 126 which is used to latch the operating arm in the preheat or broil position by cooperating with the latch pin 120.

The operating arm 104 is adapted to operate a lever 128 which projects from a casing 130 of insulating material which encloses the switch mechanism for controlling the different heating arrangements. This lever 128 is pivotally mounted upon a pin 132 which is supported at one end in a boss extending from the casing 130 and is supported at the other end in the boss 134 extending from the insulated base 70 of the thermostat 34. A contact member 136 which is curled at its upper end is connected to an anchoring bracket 138 connected to the top of the casing and provided with a binding screw 140. A connection is provided between the contact member 136 and the lever 128 in which the contact member receives a projecting portion 142 of the lever which in turn is provided with a cotterpin 144 in order to provide a satisfactory two-way connection.

The lower end of the contact member 136 is provided with a contact button which is adapted to make contact with another contact button 145 provided upon a bracket 146 which connects, by means of a portion 148 to the contact which is located behind the contact 86 in Fig. 2 and which is bridged by the contact set 82. The contact 86 is connected directly to a conducting member 150 extending outside the casing 130 and provided with a binding screw 152 for connecting with one of the full voltage power lines. The contact 84 is directly connected to the contact member 154 which likewise extends outside the casing 130 and is provided with a binding screw 156 for connection with the other full voltage power line.

The neutral power line connects to a contact screw 158 which threads into a contact carrying bracket 160 which supports a contact button capable of making contact with the contact member 162. The contact member 162 has a curled upper end which is riveted to a conducting member 164 which is fastened to the top of the case but has no binding screw attached to it. This conducting member 164, however, is connected to an electromagnet 166 fastened to and provided with a soft iron yoke 168 which is fastened by a screw to the casing 130. This electromagnet operates in conjunction with an armature 170 which is riveted to the contact member 162. It is not energized when the contact member 162 has its contact button in contact with the contact button of the contact bracket 160, but is only energized when the contact button of the contact member 162 is in contact with the contact 172 which is mounted upon the ear of the contact bracket 146. The electromagnet is electrically connected to the conducting bracket 174 which receives a binding screw 176 upon the top of the casing 130.

Referring now more particularly to Figs. 4 to 8 inclusive, the bracket 174 is connected to the upper oven heating unit 24, shown diagrammatically. The conductor bracket 138, which is connected to the contact member 136, is connected by the conductor 180 to the lower oven heating unit 182. These two oven heating units are connected to a common conductor 184 which connects with the conductor bracket 186 provided with a binding screw 188. This conductor bracket 186 supports the contact which is bridged by the bridging set 80 to the contact 84 upon the contact member 154 having the binding screw 156. It will also be seen that the binding screws 152 and 156 connect to the supply conductors 190 and 192 while the contact bracket 160 has its binding screw 158 connected to the neutral conductor 194. The bridging contact set 82 connects directly with the conductor bar 146 which is provided with the contacts 145 and 172.

When the control knob is moved to the "off" position it is held in place by the riding of the projection 118 over the latch pin 120 which holds the stop projection 114 against the guiding ear 116. This retracts the adjusting collar 154 sufficiently to hold the bridging contacts of the thermostat away from the stationary contacts to open both the full voltage circuits to isolate or disconnect heating units from the source conductors 190 and 192. The neutral conductor 194 need not be disconnected. Since the two high voltage conductors are disconnected no current can flow to the heating units.

Figure 8:
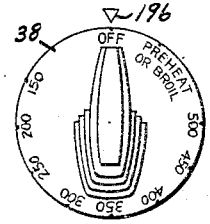
Fig. 8 is a view of the control knob.

In order to preheat the oven, the control knob is turned in a clockwise direction until the preheat legend reaches the indicating point 196, see Fig. 8. This is very nearly a complete revolution and requires that the projection 126 ride over the latch pin 120. In so doing the operating arm 104 engages the upper end of the lever 128 and moves the operating lever 128 from the full line position in Fig. 5 in a counter-clockwise direction to the dot and dash outline position shown in Fig. 5. This operation moves the contact member 162 out of engagement with the contact on the bracket 160 and into engagement with the contact 172 on the bracket 146. This allows current to flow from source 190 through bridging contact 82 and through the bracket 146 to the contact 172 thence through the contact member 162 to the conductor 164 and thence through the winding of the electromagnet 166 to the conductor bracket 174 from which the current flows through the conductor 177 through the upper heater 24, thence through the conductor 184 and across the bridging contact set 80 to the other full voltage power supply conductor 192.

Figure 5:
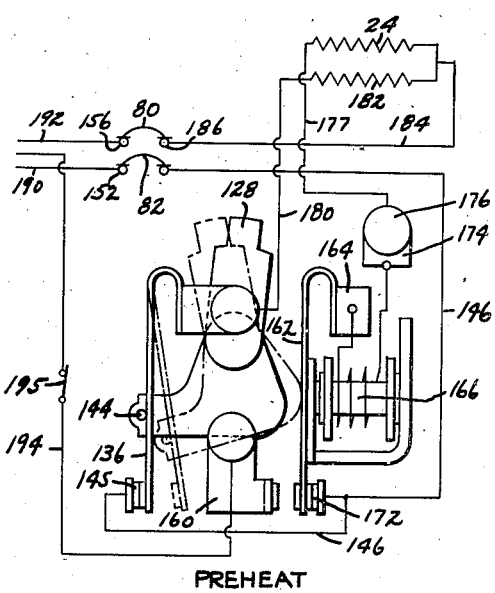
Fig. 5 is a view similar to Fig. 4 with the switch portion shown in the preheat position.

At this time no current can flow through the contact member 136 and through the lower heating unit 182 because the contact member 136 is pulled away from the stationary contact 145 to the dot and dash position as shown in Fig. 5. Thus so far only the upper heater is energized at full voltage. However, in order to energize the lower electric heater the control knob is preferably immediately turned to the temperature at which it is desired to maintain the oven. This moves the operating arm 104 in a counter-clockwise direction away from the lever 128 thereby permitting the natural spring to the contact member 136 to pull the operating lever 128 back to the full line position so that the operating member 136 is again in contact with the contact 145. The contact member 162 has an inherent spring which tends to hold it into contact with the contact provided on the bracket 160, but it is prevented from moving away from the contact 172 by the attraction of the electromagnet 166 for its armature 170.

The engagement of the contact member 136 with the contact 145 allows current to flow from the conductor 184 through the lower oven heating unit 182 and through the conductor 180 through the contact member 136 and thence to the contact 145 and through the conductor bracket 146 to the bridging contact 82 to the supply conductor 190. The circuit continues in this arrangement until the thermostat opens when the oven temperature reaches approximately the temperature to which the control knob 38 has been set. This indicates the completion of the preheat period and the adjustment of the thermostat by the control knob 38 makes it possible for the thermostat to lift the bridging contacts 80 and 82 away from the stationary contacts to stop the flow of current through the upper and lower heating units 24 and 182. This will deenergize the electromagnet 166 and allows the contact member 162 to move to its natural position into contact with the contact provided on the contact bracket 160. No current will flow until the thermostat cools.

Figure 6:
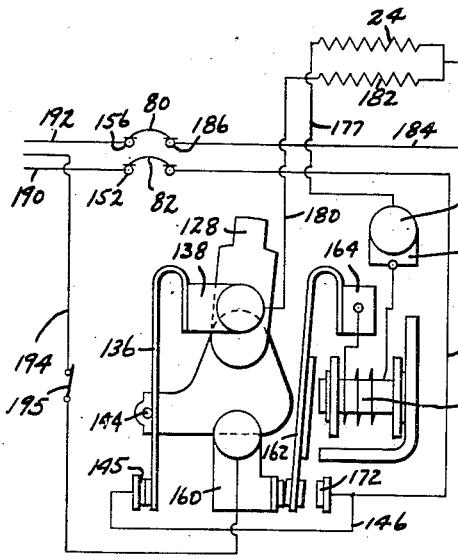
Fig. 6 is a view similar to Figs. 4 and 5 with the switch portion shown in the bake position.

When the thermostat again moves the bridging contact sets 80 and 82 into closed position the circuit will assume the arrangement shown in Fig. 6. In this position the current flows from conductor 192 through the bridging contact set 80 and through the conductor 184 to the lower heating unit 182, through the conductor 180 to the contact bracket 138, thence through the contact member 136 to the contact member 145 and thence through the conductor bracket 146 and through the bridging contact 82 to the source conductor 190. This is the same as in the second stage of the preheat. However, the current from the conductor 184 flows through the upper heater 24 through the conductor 177 to the contact bracket 174, thence through the electromagnet 166 to the conductor bracket 164, and thence through the contact member 162 to the conductor bracket 160, thence to the neutral supply conductor 194.

As is well known in the art, the voltage across the outside conductors 190 and 192 provides maximum voltage, usually about 220 or 230 volts, from the usual three-wire single phase power supply. The voltage between one of the outside conductors and the neutral conductor 194 provides only one-half the maximum voltage, namely, 110 to 115 volts. However, the application of one-half the voltage to the upper electric heater 24 reduces its output to one-fourth its maximum output. If desired a resistance may be connected between the conductor bracket 160 and the neutral supply conductor 194 in order to further reduce the current flowing through the upper heater 24 during the baking period in order to further reduce the amount of heat from the upper unit. In a two-unit oven it is desirable to provide some heat in the top of the oven, but only a relatively small amount for baking purposes which varies somewhat with the size of the oven and the particular characteristics of the heating units. However, the neutral conductor 194 may be disconnected by opening the switch 195 if no heat is desired in the top of the oven for baking purposes.

Figure 7:
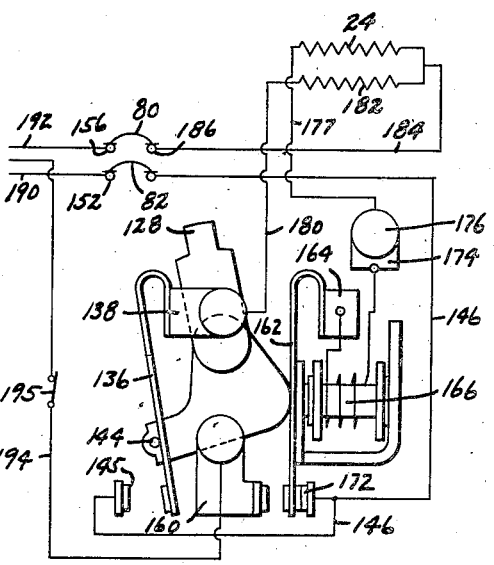
Fig. 7 is a view similar to Figs. 4, 5 and 6 with the switch portion shown in the broil position.

The current flowing through the electromagnet 166 is incapable of attracting the armature on the contact 162, unless the contact member 162 is manually moved close to the electromagnet. However, the electromagnet is only strong enough to hold the contact member 162 when the upper oven heating unit operates at maximum voltage and maximum output. Therefore the contact member 162 will be held by the electromagnet against the contact 172 only under preheating conditions, as shown in Fig. 5, and under broiling conditions as shown in Fig. 7. However, under broiling conditions the lever 128 firmly holds the contact member 162 in contact with the contact 172 as long as the control knob 38 is positioned in the broiling position.

In order to set the control for broiling the control knob 38 is turned in a clockwise direction until the legend "preheat or broil" arrives opposite the indicating mark 196. This is a position identical to the first position for preheating. However, for broiling the knob remains in this position throughout the broiling period. The turning of the knob also adjusts the thermostat for the maximum temperature setting. As in the first position for preheat, the current flows at maximum voltage through the upper heater 24 in the same manner as described for the first preheat position so that maximum output is provided in the upper unit for broiling. The contact member 136 is held away from the stationary contact 145 by the cotterpin 144 so that the lower oven heating unit 182 cannot be energized.

The control knob 38 may be turned at any time to change from any one position to any other position in order to instantly change the heating arrangement whenever desired. Thus the baking arrangement need not be preceded by the preheating arrangement and the broiling arrangement may or may not be preceded by the preheating arrangement. For example, if it is desired to preheat before broiling the control knob may be turned first to the preheat position then to the highest thermostat position until it is desired to broil and then the control 38 may be returned to the broil position. Thus I have provided in a single device operated by a single control knob a control which provides any desirable heating arrangement in a two-unit oven whenever desired, and also provides an automatic change from the preheating arrangement to the baking arrangement after preheating is accomplished.

While the form of embodiment of the invention as herein disclosed, constitutes a preferred form, it is to be understood that other forms might be adopted, all coming within the scope of the claims which follow.

What is claimed is as follows:

1. An electrical heating system for an oven comprising a source of electrical energy, an upper oven heating unit primarily for broiling purposes, a lower oven heating unit primarily for baking purposes, a thermostat for cycling said units by connecting and disconnecting said units to and from said source in accordance with oven temperatures, means subject to said thermostat for preheating said oven by securing maximum heat output from said upper and lower heating units until said oven is heated to a temperature corresponding to the setting of said thermostat, and means effective when preheating is accomplished for cycling said upper unit by energizing it intermittently at reduced heat output and cycling said lower unit by energizing it intermittenly at maximum heat ouput.

2. An electrical heating system for an oven comprising an upper oven heating unit primarily for broling, a lower oven heating unit primarily for baking, thermostaic means for cycling said units with maximum heat output from said upper and said lower heating units for preheating purposes, and means responsive to the disconnection by said thermostatic means of the upper and lower heating units from the source of electrical supply for cycling said units by intermittently energizing the upper unit at reduced heat output upon the next heating period while intermittently energizing the lower unit at full heat output during the next heating period.

3. An electrical heating system for an oven comprising a source of electrical energy, two electrical heating units one located in the lower portion and the other in the upper portion of the oven, a thermostatic control means for connecting said two heating units in parallel electric circuit relation to said source to apply substantially the same voltage to them during a preheating period, and means responsive to temperature conditions for thereafter changing the connections for intermittently energizing the upper unit at reduced voltage and intermittently energizing the lower unit at the same voltage which was applied to it during said preheating period.

4. An electrical heating system for an oven comprising a three-wire source having a relatively high voltage across two first named wires as compared with a third wire, two electrical heating units one located in the lower portion and the other in the upper portion of the oven, a thermostatic control means for connecting two of said heating units in parallel circuit relation across said two first named wires to apply the high voltage to them and to disconnect said heaters when a predetermined temperature is reached, and means responsive to said disconnecting of said heaters for thereafter cycling said upper heater by intermittently connecting it to one of said first named two wires and said third wire and cycling said lower heater by intermittently connecting it to said first named two wires.

5. An electrical heating system for an oven comprising a source of electric energy, a plurality of electrical heating units one located in the lower portion and the other in the upper portion of the oven, a thermostatic control means for controlling the connections of two of said heaters to said source, a switch means connected in series with said thermostatic control means for connecting said two heating units in parallel electric circuit relation to said source at the same voltage, said switch means including means controlled by said thermostatic control means for changing the connections for reducing the voltage applied to one of said two heating units while maintaining the same connections for the other unit.

6. An electrical heating system for an oven comprising a source of electric energy, a plurality of electrical heating units one located in the lower portion and the other in the upper portion of the oven, a thermostatic control means for controlling the connections of said upper and lower heaters to said source, a switch means connected in series with said thermostatic control means for connecting said two heating units in parallel electric circuit relation to said source at the same voltage, said switch means including an electromagnet energized by the current through one of said heating units for holding said lower unit connected in parallel electric circuit, said electromagnet being deenergized by the opening of said thermostatic control means to open the circuit through said upper heating unit.

7. An electrical heating system for an oven comprising a source of electrical energy, an upper oven heating unit primarily for broiling purposes, a lower oven heating unit primarily for baking purposes, a thermostat for connecting and disconnecting said units to said source in accordance with oven temperatures, control means subject to said thermostat for securing maximum heat output from said upper and lower units for preheating purposes, said control means also including means for securing subject to said thermostat maximum heat output of the lower unit together with less than maximum heat output of the upper unit for baking purposes, said control means also including means for securing maximum heat output from said upper unit alone for broiling purposes, and a single manipulating device for adjusting said thermostat as well as to operate said control means to optionally provide the preheating, baking, and broiling arrangements, and temperature controlled means for changing the units from the preheating arrangement to the baking arrangement.

8. An electrical heating system for an oven comprising a source of electric energy, an upper oven heating unit primarily for broiling purposes, a lower oven heating unit primarily for baking purposes, a manually settable control means having a single operating knob, means cooperating with said knob for indicating various oven temperatures as well as a preheat position, said control means having means effective when said knob is set directly to one of the various oven temperatures for so connecting said units to said source to provide maximum heat output of the lower unit together with energization producing a reduced heat output of the upper unit for baking purposes, and means effective when said knob is first turned to the preheat position and then to one of the various oven temperatures for initially so connecting said units to said source to provide maximum heat output of both units for preheating purposes and when preheating is accomplished changing the connection of said units to said source to provide maximum heat output of the lower unit in combination with energization producing a reduced heat output of the upper unit.

9. An electrical heating system for an oven comprising a source of electric energy, an upper oven heating unit primarily for broiling purposes, a lower oven heating unit primarily for baking purposes, a manually settable control means having a single operating knob, means cooperating with said knob for indicating various oven temperatures as well as a preheat position, said control means having means effective when said knob is set directly to one of the various oven temperatures for so connecting said units to said source to provide maximum heat output of the lower unit together with energization producing a reduced heat output of the upper unit for baking purposes, and means effective when said knob is first turned to the preheat position and then to one of the various oven temperatures for initially so connecting said units to said source to provide maximum heat output of both units for preheating purposes and when preheating is accomplished changing the connection of said units to said source to provide maximum heat output of the lower unit in combination with energization producing a reduced heat output of the upper unit, said control means including a thermostat controlled by said knob for regulating the supply of energy from said source according to oven temperatures.

10. An electrical heating system for an oven comprising a source of electric energy, an upper oven heating unit primarily for broiling purposes, a lower oven heating unit primarily for baking purposes, a thermostat for connecting and disconnecting said units to and from a source of electric energy to provide successive heating cycles in accordance with oven temperatures, and means responsive to the operation of said thermostat for energizing the upper unit at reduced heat output for the successive heating cycles following the first heating cycle.

11. A stove oven system comprising; an oven; heating means for said oven comprising a broiling resistance in the upper part of said oven and a baking resistance associated with said oven; energizing control means connected with said heating means and adapted to be connected to a multiple wire source of power and comprising a thermostatic element responsive to temperatures in said oven, movable and stationary contacts, electrical leads from some of said contacts to said resistances and to said wires, a unitary adjustable handle, and connections between said thermostatic element, movable contacts and handle; the arrangement being such that, upon proper manipulation of said handle terminating at one of several "bake" positions, said contacts energize both of said resistances across two wires having the highest voltage differential during a preheating cycle and thereafter said thermostatic element changes the arrangement of said contacts at a temperature selected by said manipulation to terminate said preheating cycle and thereafter to cycle said baking resistance across two wires having the highest voltage differential and said broiling resistance at a voltage less than that of said baking resistance during a baking period and, upon manipulation of said handle to a "broil" position, said contacts energize only said broiling resistance across two wires having the highest voltage differential and, upon manipulation of said handle to an "off" position said heating means is disconnected from said source of power.

12. An electrical heating system for an oven comprising a source of electric energy, an upper oven heating unit primarily for broiling purposes, a lower oven heating unit primarily for baking purposes, a manually settable control means having a single operating knob, means cooperating with said knob for indicating various oven temperatures as well as a preheat position, said control means having means effective when said knob is set directly to one of the various oven temperatures for so connecting said units to said source to provide maximum heat output of the lower unit, and means effective when said knob is first turned to the preheat position and then to one of the various oven temperatures for initially so connecting said units to said source to provide maximum heat output of both units for preheating purposes and when preheating is accomplished changing the connection of said units to said source to provide maximum heat output of the lower unit in combination with a reduced heat output from the upper unit.

13. An electrical heating system for an oven comprising a source of electric energy, an upper oven heating unit primarily for broiling purposes, a lower oven heating unit primarily for baking purposes, a manually settable control means having a single operating knob, means cooperating with said knob for indicating various oven temperatures as well as a preheat position, said control means having means effective when said knob is set directly to one of the various oven temperatures for so connecting said units to said source to provide maximum heat output of the lower unit, and means effective when said knob is first turned to the preheat position and then to one of the various oven temperatures for initially so connecting said units to said source to provide maximum heat output of both units for preheating purposes and when preheating is accomplished changing the connection of said units to said source to provide maximum heat output of the lower unit in combination with a reduced heat output from the upper unit, said control means including a thermostat controlled by said knob for regulating the supply of energy from said source according to oven temperature.

FRANCIS H. McCORMICK.